Jan. 22, 1957 C. K. LENNING 2,778,898
STEERING WHEEL ASSEMBLY
Filed Oct. 31, 1952 2 Sheets-Sheet 1

INVENTOR.
CARROLL K. LENNING
BY
HIS ATTORNEYS

Jan. 22, 1957 C. K. LENNING 2,778,898
STEERING WHEEL ASSEMBLY
Filed Oct. 31, 1952 2 Sheets-Sheet 2

INVENTOR.
CARROLL K. LENNING
BY
*Willits, Hardman and Lehr*
HIS ATTORNEYS

United States Patent Office 2,778,898
Patented Jan. 22, 1957

2,778,898

STEERING WHEEL ASSEMBLY

Carroll K. Lenning, Lansing, Mich., assignor to General Motors Corporation, Detroit, Mich., a corporation of Delaware Application October 31, 1952, Serial No. 318,015

7 Claims. (Cl. 200—61.54)

The present invention relates to steering wheels, and more particularly to a steering wheel assembly adapted for use on automotive vehicles.

Heretofore various type of resiliently mounted steering wheel assemblies have been proposed in an effort to reduce the transmission of vibration from the steering shaft to the steering wheel rim. However, in general the structures have been unsightly, thereby rendering them incompatible with the decor of a modern automobile interior. Accordingly, one of my objects is to provide a steering wheel assembly having vibration dampening means without detracting from the exterior appearance of the steering wheel.

The aforementioned and other objects are accomplished in the present invention by disposing the vibration dampening means in proximate relation to the steering wheel hub assembly, and thereafter, concealing the hub assembly and the vibration dampening means with a cover assembly. Specifically, a hub insert, suitably anchored to a steering shaft is provided with a plurality of circumferentially spaced peripheral grooves. A rubber-like cushion, constituting the vibration dampening means, circumscribes the hub insert, the cushion being bonded thereto and interlocked therewith. Circumscribing the rubber cushion is a spoke retaining member, the rubber cushion likewise being bonded thereto and interlocked therewith. A plurality of radially extending spokes interconnect the spoke retaining member and a wheel rim which is disposed coaxially of the hub assembly. The spoke inserts extend through slots in a centrally apertured cup member which is attached to the hub and radially spaced from the spoke retaining member. All steering torque between the wheel rim and the hub insert is sustained by the rubber cushion which also materially reduces the transmission of vibrations therebetween.

The upper edge of the cup member is suitably formed to support an annular perforated rubber cushion, which supports a movable horn contact plate. The movable contact plate is centrally apertured and is generally of circular configuration. A stationary horn contact plate is supported between the rubber cushion bonded to the hub insert and the spoke retaining member. Electrical connection between the two contact plates is effected by tilting movement of a horn ring operatively connected to the movable contact plate. The horn ring also constitutes a decorative cover assembly for concealing the horn blowing switch and the vibration dampening means, which form part of the hub assembly.

Further objects and advantages of the present invention will be apparent from the following description, reference being had to the accompanying drawings wherein a preferred embodiment of the present invention is clearly shown.

Figure 4:
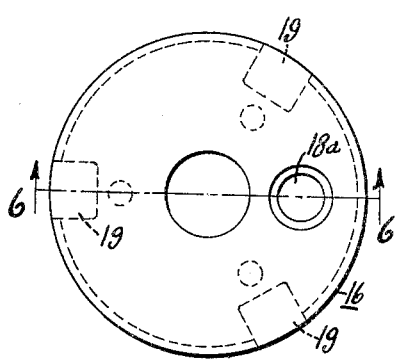
Figs. 4 and 5 are plan views of the hub insert and spoke retaining member, respectively.
Figure 5:
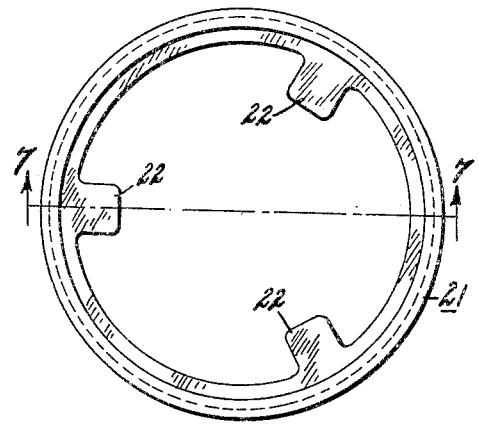
Figure 6:
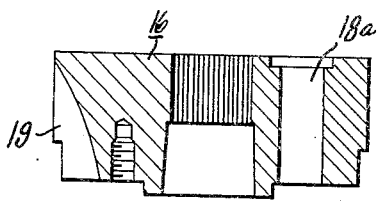
Figure 7:
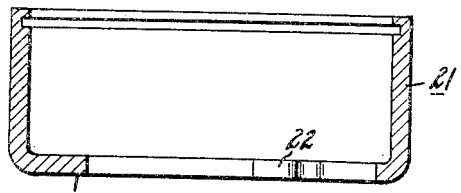

Figs. 6 and 7 are sectional views taken on lines 6—6 and 7—7 of Figs. 4 and 5 respectively.

Figure 1:
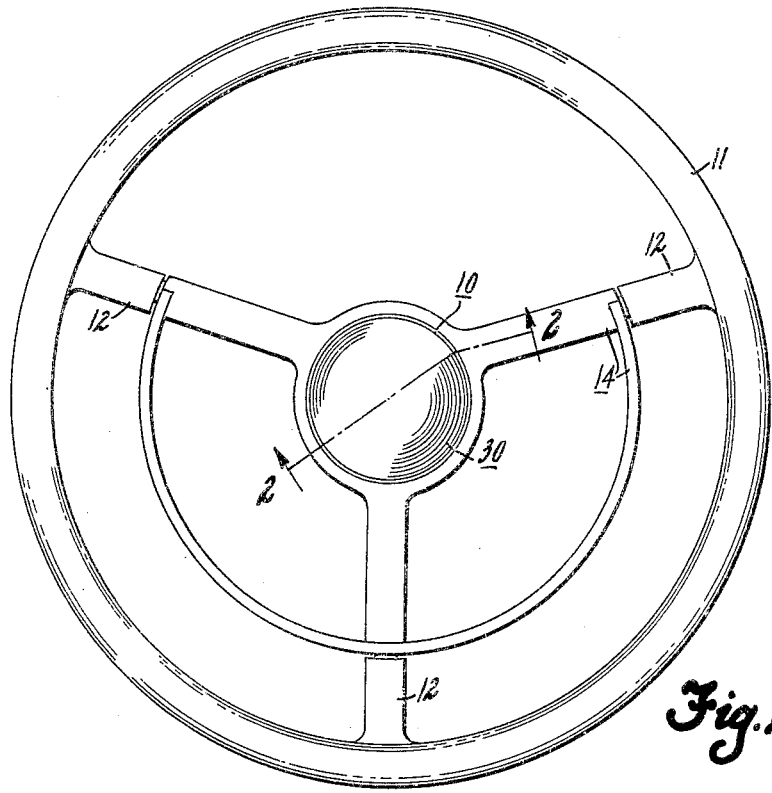
Fig. 1 is a plan view of an automotive steering wheel constructed according to the present invention.
Figure 2:
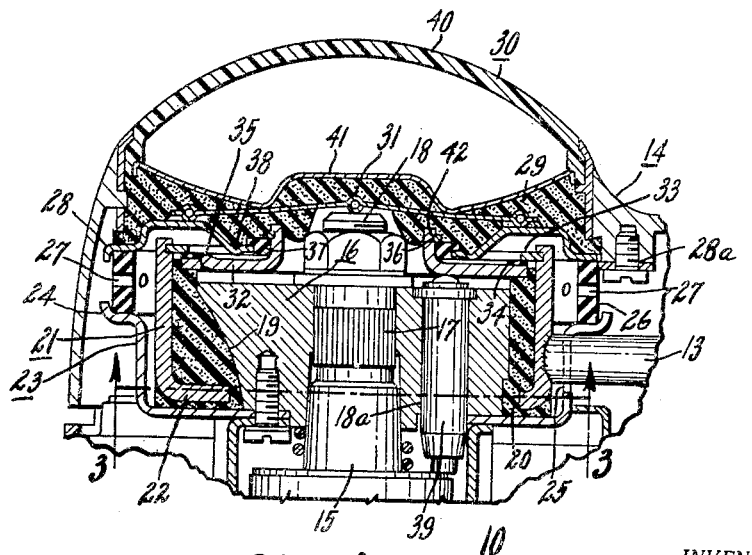
Fig. 2 is a sectional view taken on line 2—2 of Fig. 1.

Referring more particularly to Figs. 1 and 2, a steering wheel is shown comprising a hub assembly 10, a wheel rim 11 and a plurality of radially extending spokes 12 interconnecting the hub assembly and the wheel rim. The wheel rim 11 and the spokes 12 are provided with the usual reinforcing metal inserts 13, one of which is shown in Fig. 2. The spoke inserts are rigidly connected to the rim insert, and thereafter the assembly is covered with any suitable molding material. A movable horn blowing ring assembly 14 is superimposed over a portion of the spokes 12 and operates a horn blowing switch assembly, to be described, upon tilting movement thereof.

Referring particularly to Fig. 2, the construction of the hub assembly 10, with which the present invention is primarily concerned, will be described in detail. The hub assembly includes a central steering shaft 15, the steering shaft being rigidly connected to a hub insert 16 through the medium of a spline connection 17 and the usual nut and bolt assembly 18. The hub insert 16 is provided with an axially extending bore 18a and a plurality of milled peripheral grooves 19. The milled grooves are spaced substantially 120° apart about the outer periphery of the hub insert 16. Bonded to the hub insert and interlocked therewith by reason of the peripheral grooves is a rubber-like cushion 20. It is to be understood that the term "rubber" includes natural rubber or compounds thereof and synthetic rubber-like materials. A spoke retaining member 21 is likewise bonded to the rubber cushion 20 and interlocked therewith by reason of a plurality of radially inward extending tangs 22, which cooperate with the grooves 19 in the hub insert 16. The spoke inserts 13 are welded to the spoke retaining member 21. Accordingly, it is apparent that all steering loads transmitted between the hub insert and the wheel rim are carried by the resilient cushion 20. Moreover, the cushion 20 also materially reduces the transmission of vibration between the hub insert 16 and the wheel rim 11.

Figure 3:
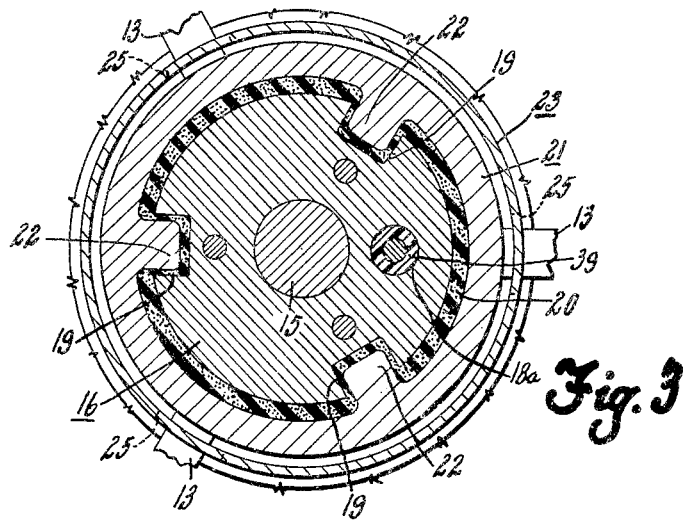
Fig. 3 is a sectional view taken on line 3—3 of Fig. 2.

As is particularly apparent from a comparison of Figs. 2 and 3, the rubber-like cushion 20, interposed between the spoke retaining member 21 and the hub insert 16, around the tangs 22, is of less thickness along the peripheral edges than above the faces thereof. In this manner, the rotative flexibility, or lost motion between the steering wheel and hub insert, may be reduced to a minimum, while a substantial degree of axial resilience between the steering wheel and hub is afforded. It is readily apparent that the rotative flexibility of the assembly may be increased if it is desired to cushion out wheel flight, by increasing the thickness of the cushion material between the peripheral edges of the tangs 22 and the side walls of grooves 19.

Suitably attached to the hub insert 16 and radially spaced from the spoke retaining member 21 is a centrally apertured cup-shaped member 23. The cup-shaped member 23 is provided with an outwardly flanged portion 24 and a plurality of slots 25, through which the spoke inserts 13 extend. However, it is to be noted that no metal to metal contact exists between the spoke inserts and the cup-shaped member 23. The flanged portion 24 supports an annular cushion 26 provided with a plurality of equally spaced openings 27. The cushion 26 supports a movable horn contact plate 28, which is generally of circular configuration and centrally apertured. A third cushion 29 maintains the plate 28 in engagement with the cushion 26, the cushion 29 being suitably supported within a cover assembly 30 that encloses the hub assembly. The cover assembly 30 may be formed in part by a die casting and is connected by means of screw devices to radially extending tangs of the movable contact plate 28, as is indicated at 28a. The cover assembly 30 constitutes a portion of the horn blowing ring 14.

The cushion 29 is suitably slotted to support a conductor strap 31 of resilient material, the conductor strap having electrical contact with the grounded steering shaft 15 and also having electrical contact with the movable contact plate 28. A stationary contact plate 32 is insulatedly supported on the cushion 29 and retained in position by means of a snap ring 33. The snap ring 33 engages an insulating strip 34, which is retained in position upon the contact plate 32 by means of a plurality of projections formed therein, one of which is shown at 35. The stationary contact plate 32 is also supported by an irregular shaped ring member 36, which has connection with a groove 42 in the plate 32 and the cushion 29. An insulator member 37 is retained between adjacent surfaces of the two contact plates 28 and 32. Movable contact plate 28 is provided with an annular depression 38, which is adapted to engage the stationary contact plate 32 upon tilting movement of the horn ring 14. Electrical connection to the stationary contact plate 32 is effected by a cartridge 39, which is insulatingly supported within the hole 18a of the hub insert. The electrical connection to the cartridge and the stationary contact plate 32, not shown, may be effected in any well known manner. The cover assembly 30 includes a transparent horn button 40 through which a suitable design formed on a plate 41 may be seen. The plate 41 is retained between the cushion 29 and the horn button 40.

As is readily apparent, the entire hub assembly is adapted to be enclosed by the cover assembly so as not to detract from the exterior appearance of the steering wheel. The steering torque transmitted between the wheel rim 11 and the hub insert 16 is carried by the rubber cushion 20. By reason of there being no metal to metal contact between the spoke inserts and the hub insert, vibrations normally transmitted therebetween will be damped by the resilient cushion 20. The horn blowing switch assembly, constituted by contact plates 28 and 32, is supported between the lower cushion 26 and the upper cushion 29. The lower cushion 26 normally maintains the contact plates 28 and 32 out of electrical engagement. However, upon tilting movement of the horn blowing ring 14, the movable contact plate 28 will be tilted by reason of its mechanical connection at 28a, thereby compressing the lower cushion 26 and effecting electrical engagement between the depressed portion 38 of the movable contact plate and the stationary contact plate 32. Immediately upon release of the horn blowing ring 14, the lower cushion 26 will return to its normal position, as shown in the drawing, thereby separating the contact plates 28 and 32.

From the foregoing, it is apparent that the present invention provides a compact hub assembly including vibration dampening means and a horn blowing switch assembly. Moreover, the exterior appearance of the steering wheel assembly is compatible with modern vehicle interiors.

While the embodiment of the present invention as herein disclosed, constitutes a preferred form, it is to be understood that other forms might be adopted.

What is claimed is as follows:

1. A steering wheel including a hub assembly, a rim, and a plurality of spokes interconnecting said rim and said hub assembly, said hub assembly including a hub insert member, the connection between said hub insert member and said spokes including vibration dampening means comprising a rubber cushion circumscribing said hub insert member and a spoke retaining member circumscribing said cushion, one of said members having a plurality of circumferentially spaced radially extending tangs, the other of said members having a like number of circumferentially spaced tang receiving grooves therein, said cushion being adherently bonded to and interlocked with said hub insert member, said cushion also being adherently bonded to and interlocked with said spoke retaining member, said spokes being attached to said spoke retaining member whereby all steering loads between said hub insert and said rim are sustained by said rubber cushion.

2. In a steering wheel, a hub member, a rim and a plurality of spokes rigidly connected to said rim and resiliently connected to said hub member by a vibration dampening joint, said joint including a spoke retaining member radially spaced from and circumscribing said hub member, one of said members having a plurality of circumferentially spaced radially extending tangs, the other of said members having a like number of circumferentially spaced tang receiving grooves therein, and a rubber cushion disposed between said members, said rubber cushion being bonded thereto and interlocked therewith.

3. In a steering wheel, a hub member, a rim and a plurality of spokes rigidly connected to said rim and resiliently connected to said hub member by a vibration dampening joint, said joint including a spoke retaining member radially spaced from and circumscribing said hub member, said spoke retaining member having a plurality of circumferentially spaced radially extending tangs, said hub member having a like number of circumferentially spaced tang receiving grooves therein, and a rubber cushion disposed between said members, said rubber cushion being bonded thereto and interlocked therewith.

4. A hub assembly for a steering wheel including a hub insert having a plurality of circumferentially spaced peripheral grooves therein, a spoke retaining member having a plurality of circumferentially spaced radially inward extending tangs, said member circumscribing said insert and being radially spaced therefrom, the number of said tangs being equal to the number of said hub insert grooves, and a rubber cushion disposed between said spoke retaining member and hub insert, said rubber cushion being bonded to and interlocked with both said spoke retaining member and said hub insert.

5. A hub assembly for a steering wheel including a hub insert, a spoke retaining member circumscribing said insert and radially spaced therefrom, a rubber cushion interconnecting said insert and member and disposed therebetween, a stationary horn contact plate supported on said cushion, a cup member attached to said insert and radially spaced from said spoke retaining member, a movable horn contact plate supported by said cup and insulated therefrom, said contact plates having contiguous portions adapted for engagement, and a hub cover assembly supported by said movable contact ring and adapted for movement relative to said hub insert to effect engagement between said horn contact plates.

6. A hub assembly for a steering wheel including a hub insert, means attached to said hub insert and insulatingly supporting a pair of relatively movable horn contact plates including a cup-shaped member and an annular perforated rubber cushion normally maintaining said contact plates out of engagement, and a hub cover assembly attached to one of said horn contact plates and movable relative to said hub insert for effecting engagement between said horn contact plates by compressing said perforated cushion.

7. A hub assembly for a steering wheel including, a hub insert, means attached to said hub insert and insulatingly supporting a pair of relatively movable horn contact plates including a cup-shaped member and an annular perforated rubber cushion normally maintaining said contact plates out of engagement, a resilient conductor strap having electrical contact with the hub insert and one of said contact plates for connecting said one contact plate to ground, means insulatingly supported by said hub insert and having electrical engagement with the other contact plate for connecting said other contact plate to a source of electric current, and means operatively connected to one of said horn contact plates and movable relative to said hub insert for effecting electrical engagement between said horn contact plates by compressing said perforated rubber cushion.

References Cited in the file of this patent

UNITED STATES PATENTS

| | | |
|---|---|---|
| 1,728,579 | Trier | Sept. 17, 1929 |
| 1,826,278 | Flanigan | Oct. 6, 1931 |
| 1,847,758 | Geyer | Mar. 1, 1932 |
| 2,095,983 | Hollingsworth | Oct. 19, 1937 |
| 2,215,677 | Walker | Sept. 24, 1940 |
| 2,235,069 | Geyer | Mar. 18, 1941 |
| 2,454,242 | Wharam et al. | Nov. 16, 1948 |
| 2,631,204 | Kibiger | Mar. 10, 1953 |

FOREIGN PATENTS

| | | |
|---|---|---|
| 525,293 | Great Britain | Aug. 26, 1940 |